(12) United States Patent
Frank

(10) Patent No.: US 6,654,856 B2
(45) Date of Patent: Nov. 25, 2003

(54) SYSTEM AND METHOD FOR MANAGING STORAGE SPACE OF A CACHE

(75) Inventor: Alexander Frank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/855,957

(22) Filed: May 15, 2001

(65) Prior Publication Data

US 2002/0174302 A1 Nov. 21, 2002

(51) Int. Cl.[7] .............................................. G06F 12/00
(52) U.S. Cl. ..................... 711/133; 711/118; 711/134
(58) Field of Search ................................. 711/118, 205, 711/119, 133–134, 170, 171, 113, 125, 136, 206, 141; 709/203

(56) References Cited

U.S. PATENT DOCUMENTS

| 4,802,086 | A | * | 1/1989 | Gay et al. ................... 711/133 |
| 5,913,224 | A | * | 6/1999 | MacDonald ................ 711/125 |
| 5,974,508 | A | * | 10/1999 | Maheshwari ................ 711/133 |
| 6,012,126 | A | * | 1/2000 | Aggarwal et al. .......... 711/133 |
| 6,061,764 | A | * | 5/2000 | Chittor et al. .............. 711/141 |
| 6,349,364 | B1 | * | 2/2002 | Kai et al. .................... 711/133 |
| 6,353,874 | B1 | * | 3/2002 | Morein ........................ 711/118 |
| 6,389,510 | B1 | * | 5/2002 | Chen et al. ................. 711/113 |
| 6,438,655 | B1 | * | 8/2002 | Nicol et al. ................ 711/136 |
| 6,446,188 | B1 | * | 9/2002 | Henderson et al. ......... 711/206 |

* cited by examiner

Primary Examiner—Kimberly McLean-Mayo
(74) Attorney, Agent, or Firm—Leydig, Voit & Mayer, Ltd.

(57) ABSTRACT

A system and method for managing a cache space employs a space allocation and recycling scheme that has very low complexity for each data caching transaction regardless of the size of the data set, is virtually fragmentation free, and does not depend on garbage collection. The cache space is treated as a linear space with its two ends connected in the manner of a cyclic queue. The reclaiming and allocation of cache space for writing new objects proceeds as an "allocation wave" that sweeps in a pre-selected direction over the "circular" cache space. As the allocation wave moves along the circular space, the space used by existing objects are reclaimed for writing new objects except for those existing objects that for some reason are not to be written over. Those existing objects to be passed over by the allocation wave are viewed as "interruptions" to the generally first-in-first-out (FIFO) allocation scheme for writing new objects into the circular cache space.

16 Claims, 10 Drawing Sheets

SYSTEM AND METHOD FOR MANAGING STORAGE SPACE OF A CACHE

TECHNICAL FIELD OF THE INVENTION

This invention relates generally to computer data storage and retrieval, and more particularly to the management of a cache to provide effective usage of the cache space.

BACKGROUND OF THE INVENTION

A cache is an amount of data storage space that is used to hold recently accessed data for quick access in subsequent references. The retrieval of data from the cache is typically significantly faster than accessing a data source from which the data in the cache are originally obtained. By storing recently accessed data in the cache, the data can be retrieved and made available quickly the next time they are requested. Data caching is one of the most fundamental concepts in the computer science and has been widely applied in various applications where it is desired to minimize the data access time. The effective use of a cache space is, however, not a simple matter, especially when the cache space and the number of cached data objects become very large.

For instance, in the context of accessing information available from the World-Wide Web ("WWW") on the Internet, it is common for a proxy server of a private network to cache data objects downloaded from various Websites in response to requests by computers on the private network. When the proxy server receives a request from a computer on the private network for a particular data object, it checks the cache (often referred to as the "cache unit") to see whether the requested object is already in the cache. If the requested object is not in the cache, the proxy server forwards the request on to the Internet so the requested data object can be downloaded from a Website. On the other hand, if the requested data object is found in the cache unit (which is called a "cache hit"), it is retrieved from the cache and sent to the requesting computer. In this way, the need to keep the user waiting while the requested data object is being downloaded through the Internet is avoided. Since the speed of downloading data objects from Websites can be very slow, a properly implemented cache unit can significantly reduce the average amount of time for a user to receive a requested data object, thereby providing a significantly improved user experience.

The performance requirements on the cache unit, however, can be very high. For instance, a typical implementation of a cache unit may be expected to hold up to 50 millions data objects. With such a large number of data objects, it can become very difficult to effectively manage the cache space to provide an adequate performance of the caching operation.

Tradition approaches to cache space management treat the cache space as disjointed pieces that can be separately allocated and recycled in a generally random manner. As new data objects are continuously being added to the cache, the cache space has to be reclaimed by removing existing cached objects and allocating the reclaimed space to the new objects. Efficient reclaiming of the cache space typically relies upon sophisticated scavenging and garbage collection schemes. The complexity of managing the cache space usage increases as the cache size becomes larger. With the increased overhead for each object caching transaction, the caching operation slows down significantly, and the number of cache hits per unit time is reduced. Moreover, the scavenging and garbage collection operations tend to add spikes to the demand for the computer processing power. Such spikes can interrupt and delay the write and read operations and cause further degradation of the cache performance. Another issue with common cache design paradigms is the fragmentation of the cache space, which becomes increasingly difficult to manage as the cache size grows.

SUMMARY OF THE INVENTION

In view of the foregoing, the present invention provides a system and method for managing a cache space according to a unique space allocation and recycling scheme that has very low complexity for each data caching transaction regardless of the size of the data set. In addition, this invention is virtually fragmentation free, and does not require garbage collection or scavenging techniques. The space allocation and recycling scheme is based on a novel approach that treats the cache space as a linear space with its two ends connected in the manner of a cyclic queue. Each new write operation may involve reclaiming the space used by an existing object or objects for writing the new object. The reclaiming of cache space can be viewed as an "allocation wave" that sweeps in a pre-selected direction over the "circular" cache space. As the allocation wave moves along the circular space, the space used by existing objects are reclaimed for writing new objects except for those existing objects that for some reason are not to be written over. Those existing objects to be passed over by the reclaiming wave are viewed as "interruptions" to the generally first-in-first-out (FIFO) allocation scheme for writing new objects into the circular cache space. Such interruption objects may include, for instance, hot objects that are frequently requested.

By virtue of this linear progression of the allocation wave along a circular space to reclaim cache space for storing new objects, there is no need for any sophisticated and complex garbage collection or scavenging techniques. Moreover, the complexity of each allocation operation does not depend on the size of the data object to be written to the allocated space. Also, as long as the portion of interruption objects is low, the allocation complexity is O(1) in average. In other words, the allocation complexity does not increase with the number of objects in the cache.

In accordance with another aspect of the invention, a cache system architecture is provided that is based on the new approach to cache space management described above. This cache system architecture effectively couples a cache space residing in the main memory of the computer, such as the random-access memory (RAM), with a cache space on a mass storage device, such as a hard disk. The cache space in the main memory is used as a buffer for storing objects that are to be written into or retrieved from the cache space on the disk. The cache space in the main memory and the storage device are each managed as a circular space with "interruptions". Moreover, the operation of copying objects from the main memory space into the storage device space also progresses as a wave along the circular memory cache space. Objects that should not be written into the disk cache space, such as those that are still being downloaded from the Internet, are viewed as "interruptions" and skipped over by the copy wave.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
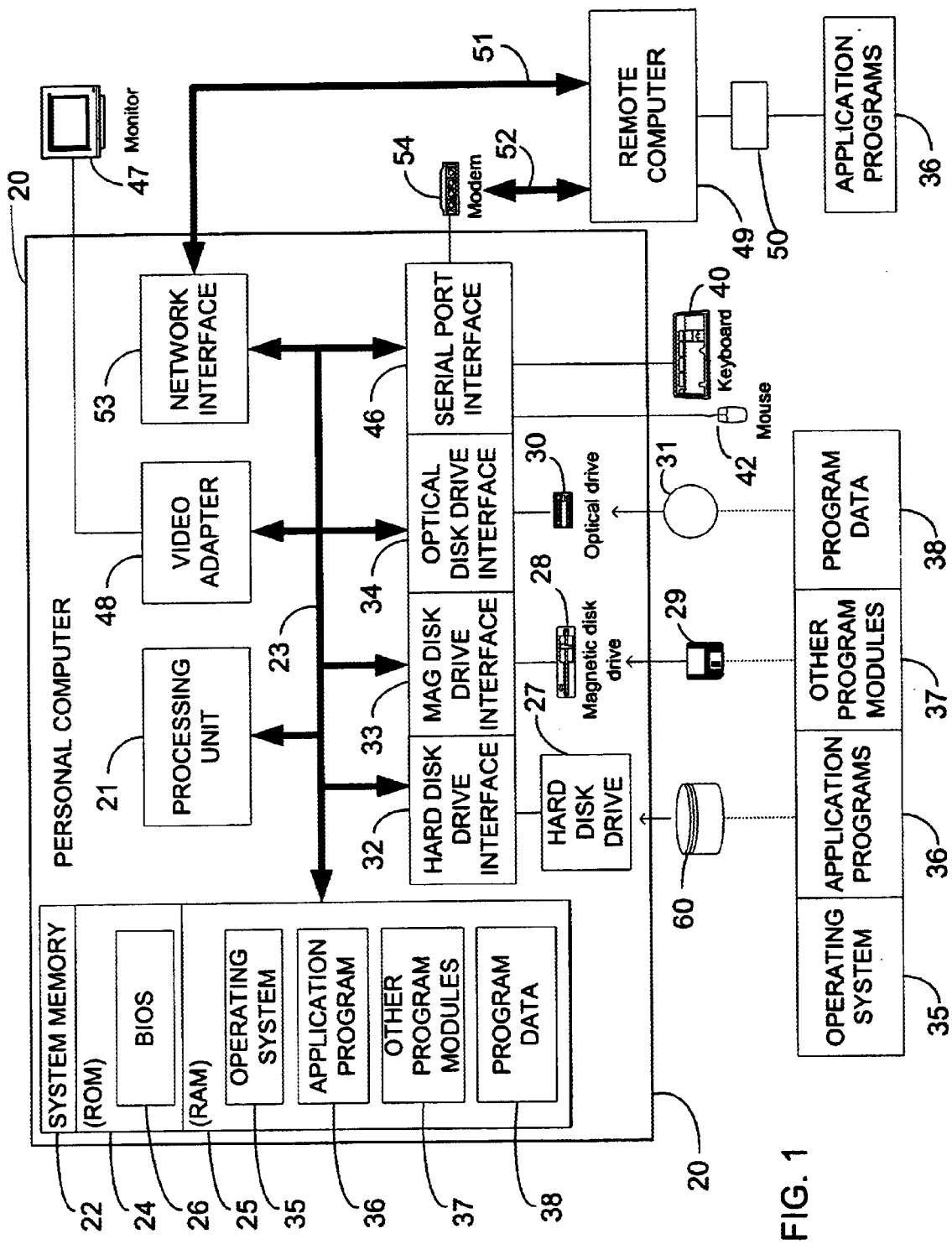
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2–10. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
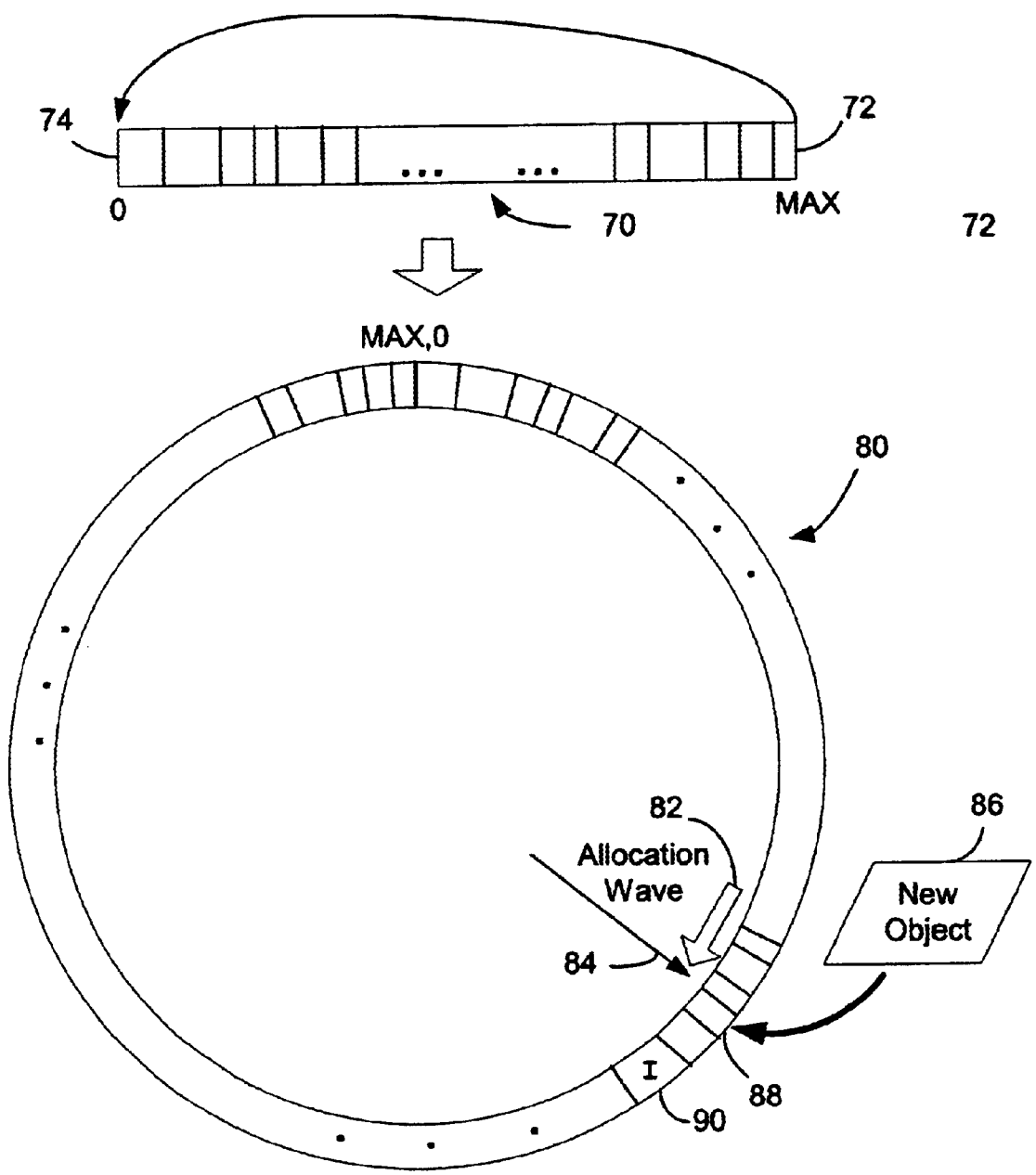
FIG. 2 is a schematic diagram illustrating a cache space operated in accordance with the invention as a cyclic queue, the space of which is reclaimed and allocated for writing new objects in a generally first-in-first-out ("FIFO") manner with interruptions.

Referring now to FIG. 2, the present invention is directed to a unique new approach to the management of the space of a cache 70 for storing cached data objects. The cache 70 may reside on various types of storage media. For instance, the cache may be part of the main memory of a computer, such as the random access memory ("RAM"), or on a mass storage device, such as a hard disk or magnetic tape. As will be described in greater detail below, the cache space management according to the invention can be advantageously applied regardless of the specific type of storage media used, as long as the cache space can be managed as a generally linear addressable space for data storage.

In contrast to the traditional approach of considering a cache space as disjointed pieces that are separately allocated and recycled in a generally random manner, the invention is based on a very different concept that treats the storage space of the cache 70 as a linear space with its two ends 72 and 74 logically connected for purposes of write and read operations. The "connection" of the two ends of the cache space is, of course, in the addressing sense rather than requiring a physical connection between the two ends. With its two ends connected, the cache space 70 is in effect turned into a cyclic queue. For illustration purposes, FIG. 2 shows a circular space 80 to represent the cyclic queue. It will be appreciated, however, that this circular space 80 is only a conceptual view of the underlying cache space 70 and is not to be confused as a separate cache space.

The scheme in accordance with the invention for space allocation and recycling can be characterized as a first-in-first-out ("FIFO") operation with "interruptions" on the circular cache space 80. Specifically, the allocation of cache space 80 can be viewed as an "allocation wave" ("AW") 82 that sweeps in a pre-selected direction over the "circular" cache space. The front of this allocation wave 82, identified by the arrow 84 in FIG. 2, is the point up to which the cache space 80 has been reclaimed from old objects for writing new objects. As the allocation wave front moves over existing objects, the space occupied by those existing objects, except for those objects 90 that are called "interruptions," is reclaimed and allocated for writing new objects. In this way, as the allocation wave 82 travels along the circular space 80, new objects 86 are written over existing objects 88 in a generally continuous manner. Since the allocation wave travels in a pre-selected direction along the circular space, the order of the cached objects in the cache space generally correspond to the order in which the cache space is allocated for them. As the allocation wave goes around the circular cache space, the oldest cached objects (if they are not "interruptions") are written over by the new objects, hence the "FIFO" designation.

The "interruptions" in this cache space reclaiming and allocation scheme are those objects that, for whatever reason, should be kept. In other words, they are not to be written over by new objects. When the allocation wave reaches such an object, it passes over that object and moves on to the next object, instead of reclaiming and reallocating the space occupied by that "interruption" object for writing a new object. The allocation wave moves on until enough space is reclaimed for the new object. Depending on the purposes for which the cache is used, there can be many different reasons for designating a cached object as an "interruption" of the generally FIFO scheme. For instance, a cached object may be designated as an "interruption" if it is frequently or recently referenced. Such an object is often called a "hot" object. An "interruption" object may also be an object on which a read or write operation is ongoing and thus should not to be disturbed. It should be noted that during the operation of the cache the cached objects may move dynamically between the "Interruption" and "non-interruption" states. For instance, a non-interruption object may become an interruption when it is requested by a client and thus becomes a "hot" object.

By virtue of the linear progression of the allocation wave 82 along the circular cache space 80 to reclaim and allocate space for storing new objects, space reclaiming and allocation are performed at the same time in a smooth, continuous, manner. There is no need for any sophisticated and complex garbage collection or scavenging techniques. Furthermore, as long as the density of "interruption" objects is reasonably low and not concentrated in the same area of the cache space, the allocation complexity is of the order of O(1) in average regardless of the total cache size and number of cached objects. Moreover, as described in greater detail below, in a preferred embodiment the cache space is managed on a block-by-block basis, and the complexity of each block allocation does not depend on the size of the data to be written to the allocated media. In addition, assuming a reasonably low density of "interruptions", this cache space management scheme is virtually fragmentation free. These properties are especially important for applications where the size of the cache space and the number of cached objects are very large.

With the general concept of the invention described above, the following description is directed to an embodiment in which the cache is a cache unit used by a proxy server for caching objects downloaded from the World Wide Web ("WWW") on the Internet. It will be appreciated, however, that the cache space management according to the invention can be effectively applied in a variety of caching applications. Also, in the embodiment described below, the cache unit system utilizes storage space provided partially by a hard disk and partially by the main memory of the computer. It will be appreciated, however, that the invention can be used to manage caches in different data storage medium and are not limited to the main memory or a hard disk.

Figure 3:
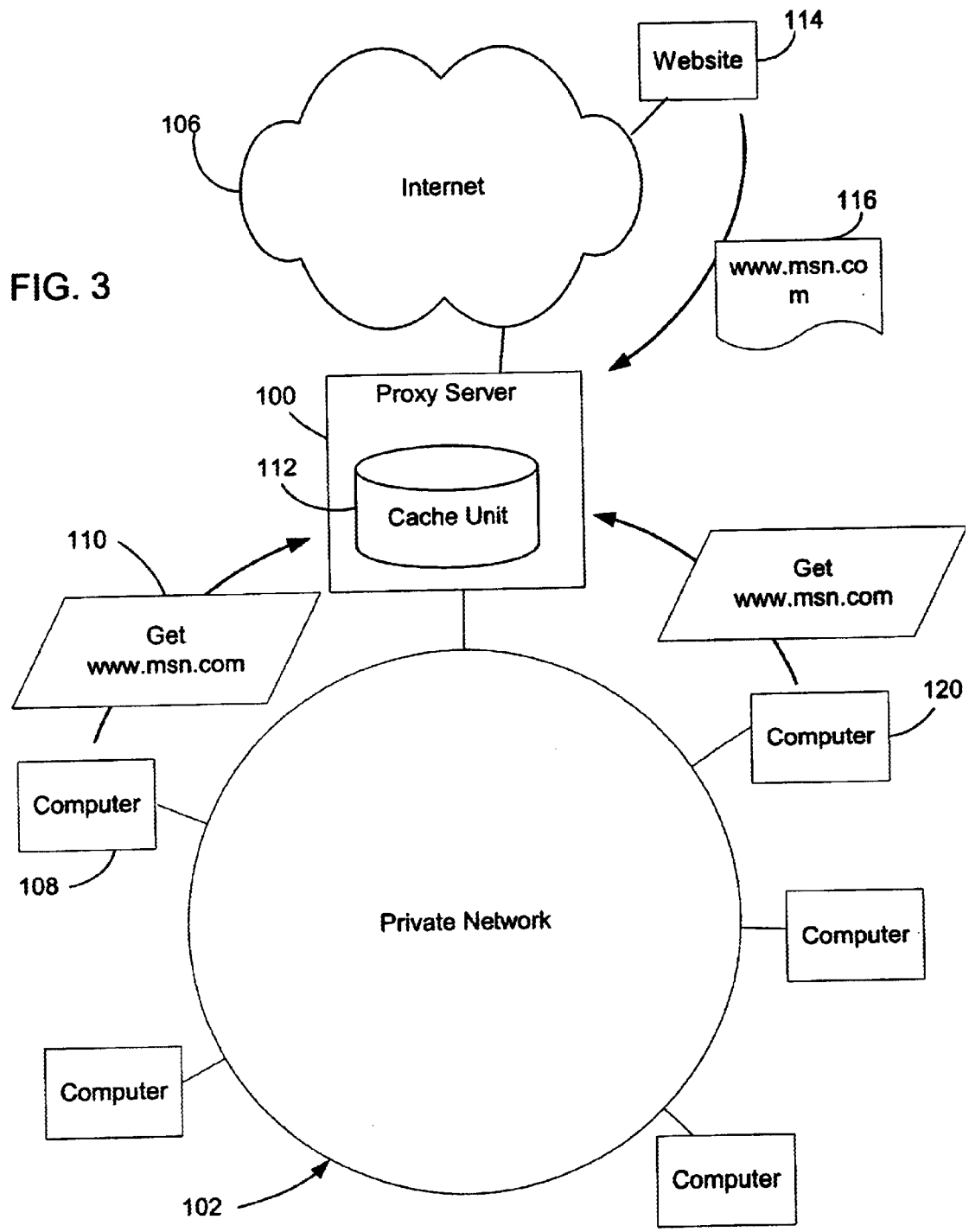
FIG. 3 is a schematic diagram showing an application of the invention in which a proxy server uses a cache unit for storing data objects downloaded from the Internet.

Turning now to FIG. 3, in this embodiment, the proxy server 100 resides on a private network 102, such as a corporate network or a home network. The proxy server 100 is connected to the Internet 106 and functions as the gateway/firewall for the private network. When a computer 108 on the private network makes a request 110 for downloading a data object from the Internet, that request is sent to the proxy server 100. The requested data object is identified by a URL. For example, the requested data object may be the Web page corresponding to the URL www.msn.com. When the proxy server 100 receives the request 110, it checks the cache unit 112 to see whether there is an object in the cache unit that corresponds to the URL. If so, the proxy server retrieves the data object and sends it to the requesting computer 108. If the requested object is not in the cache 112, the proxy server 100 forwards the download request 110 to the Internet 106. The request is then routed to a pertinent Website 114, which transmits the requested data object 116 to the proxy server 100. The proxy server 100 stores the downloaded data object in the cache unit 112 and also sends it to the requesting computer 108. Later, if the proxy server 100 receives another request for the same data object from the same computer 108 or a different computer 120, it can provide the object from the cache without having to download the object from the Internet again. Downloading a data object from the Internet often takes a long time, especially when the connection is slow. The proxy can provide the requested data object quickly if there is a cache hit.

Figure 4:
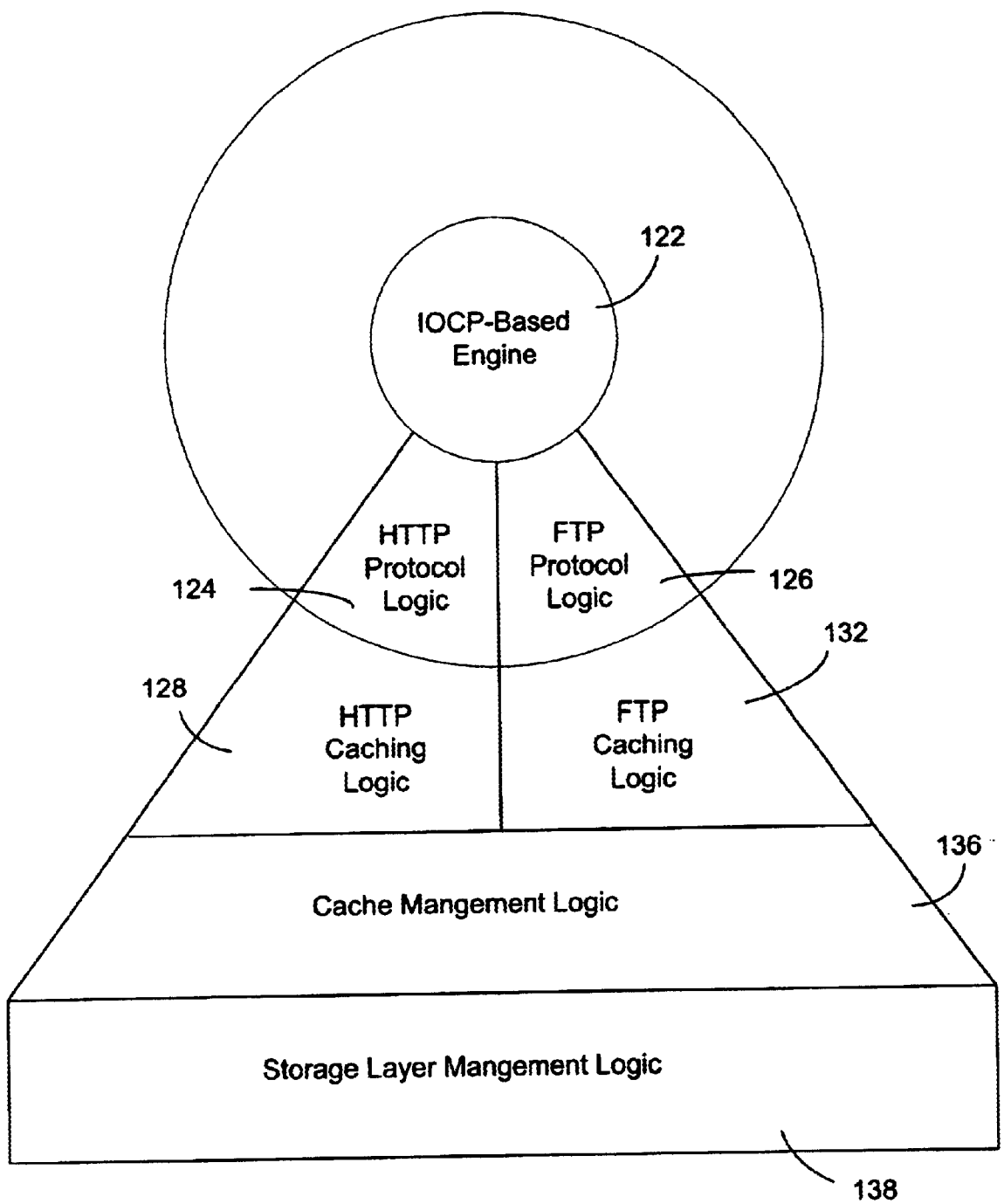
FIG. 4 is a schematic diagram showing the architecture of the proxy server of FIG. 3 in one embodiment.

Turning now to FIG. 4, in a preferred embodiment, the proxy server has an engine 122 preferably based on the I/O Completion Ports ("IOCP") of the Windows NT operating system of Microsoft Corporation. Surrounding the core is a layer of protocol logic modules for various transfer protocols, such as the Hypertext Transfer Protocol ("HTTP") and the File Transfer Protocol ("FTP"). For illustration purposes, only the HTTP logic 124 and FTP logic 126 are shown in FIG. 4.

Each protocol logic has its corresponding caching logic, such as the HTTP caching logic 128 or the FTP caching logic 132. The protocol caching logic implements protocol related details about caching. For instance, the HTTP caching logic includes: cache-ability checking, computation of the cached object expiration time (a.k.a. TTL), support of the HTTP Range & Vary headers, etc.

Below the caching logics is the Cache Management Logic 136, which handles directory service, object lock management, I/O operation initiation, index backup and restoration, recovery, cache file initiate/open/create operations, initializing sequences, management of dynamically variable hot vs. cold object states, etc. Below the Cache Management Logic 136 is the Storage Layer Management Logic 138. This layer handles the management of cache space in both the main memory and the disk, disk space allocation, the allocation wave, the write wave, batch write, disk load balancing, hot objects infrastructure, mapping of objects to memory/disk blocks, and space scanning infrastructure, etc.

Figure 5:
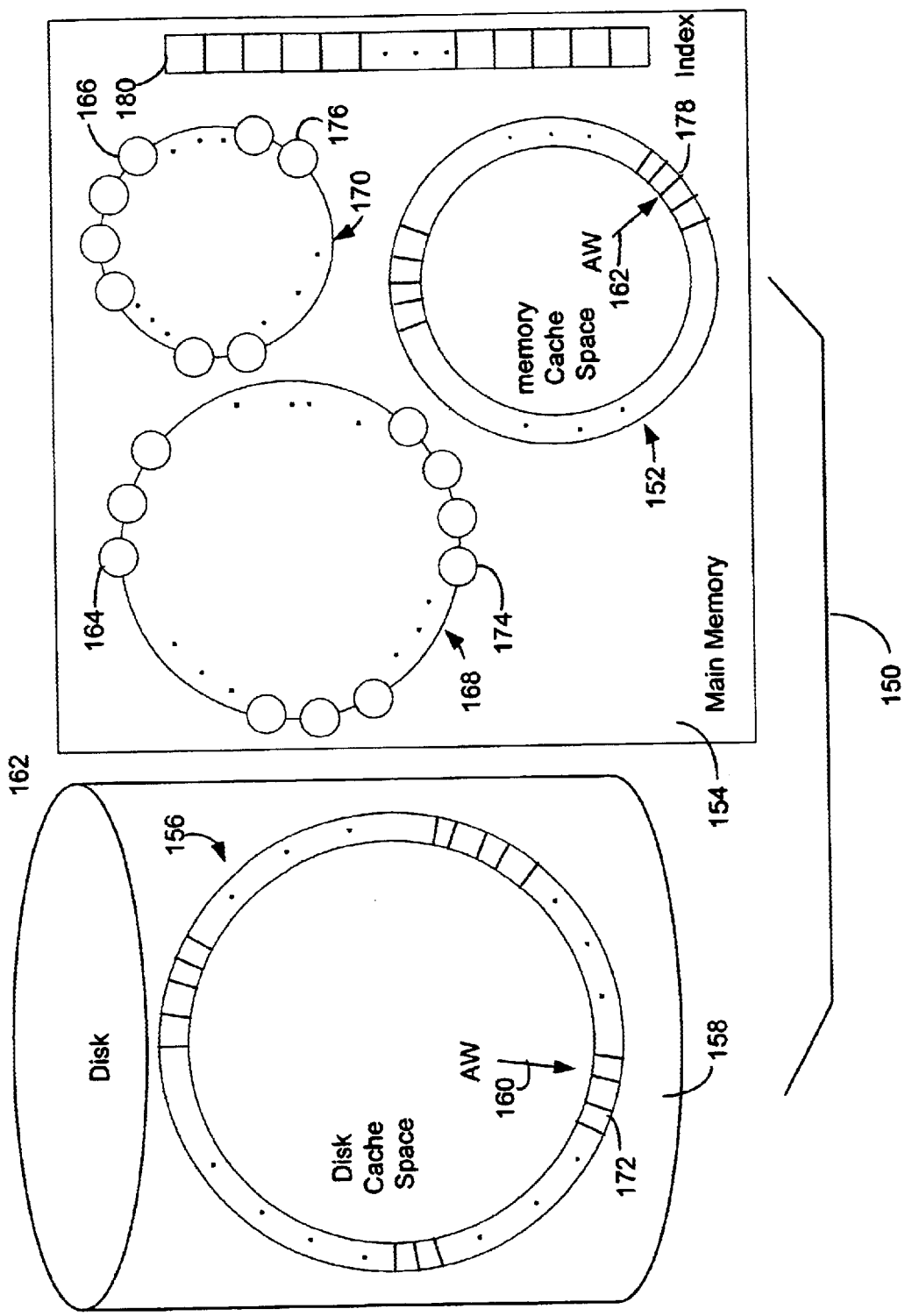
FIG. 5 is a schematic diagram showing data structures involved in the embodiment of FIG. 4 for cache space management.

FIG. 5 illustrates an architecture of data structures involved in the cache space management for the cache unit. In this embodiment, the cache unit 150 includes both a cache space 152 in the main memory 154 of the computer and a cache space 156 on a hard disk (or hard disks) 158. Unless specified otherwise, the cache space in the main memory is referred to hereinafter as the "memory cache space", and cache space on the hard disk as the "disk cache space." The memory cache space 152 is used as a buffer for storing downloaded data objects that are to be stored into the disk cache space 156. The memory cache space 152 is also used to store objects that are being served to clients. Such objects are typically read from the disk cache space 156 into the memory cache space 152, and if they are very "hot" they may live in the memory cache space for a considerable length of time.

In accordance with a feature of the embodiment, each of the disk cache space 156 and memory cache space 152 is managed as a cyclic queue operated in the FIFO manner with interruptions. Accordingly, the disk cache space 156 and the memory cache space 152 are presented in FIG. 5 as circular spaces and have respective allocation waves 160 and 162. Moreover, the two cache spaces are coupled together by copying operations. As will be described in greater detail later, the copying operations are also managed in the manner of FIFO with interruptions.

In accordance with another feature of the embodiment, each of the disk cache space 156 and the memory cache space 152 is managed on a block-by-block basis rather than on an object-by-object basis. In one implementation, the block size is flexible and may vary from 0.5K bytes to 64K bytes in 0.5K bytes increments. More precisely, the block size is an integer multiplication of the physical size of the minimum storage unit size processed by the storage device. For a disk, the block size is typically N×0.5 KB. For the main memory, it is typically N×1 byte. The block size should also allow for meta-information, which sets a lower bound of the block size. The upper bound (64 KB in one implementation) is introduced by the block-based space management scheme. Each block preferably contains a single object. Nevertheless, some data objects may be larger than 64 KB. Such an object is broken up and stored in multiple blocks, which are not required to be consecutive in the cache space. Thus, an object may occupy one or more data blocks.

To keep track of the cached data blocks on the disk, each data block has an associated descriptor 164, which is stored in main memory 154. Similarly, each block in the memory cache space 152 has a corresponding descriptor 166. The descriptors for each space are organized in a circular linked list, and ordered in the same order as the blocks of the corresponding cache space. The last descriptor closes the circle by linking to the descriptor for the first data block in the cache space. Thus, the linked descriptors for each cache space may be conceptually viewed as forming a ring, which is referred to hereinafter as a descriptor ring. As illustrated in FIG. 5, the data structures include a disk descriptor ring 168 for the disk cache space and a memory descriptor ring 170 for the memory cache space. Each cache space is managed by virtue of its associated descriptor ring. For illustration purposes, the memory descriptor ring 170 is shown in FIG. 5 to be separate from the memory cache space 152. In one implementation, however, the memory cache descriptors are actually embedded in the memory cache space as headers of the corresponding memory blocks.

Each descriptor in the disk descriptor ring or the memory descriptor ring includes data specifying the size of the block and its location in the cache space. For instance, the location of a block 172 in the disk cache space 156 is given in the corresponding disk descriptor 174 as the offset of the block from the zero position of the disk cache space. If the object exists in both the disk cache space 156 and the memory cache space 152, the disk block descriptor 174 also contains a pointer that points to the memory block descriptor 176, which points to the corresponding memory block 178. The memory block descriptor likewise has a pointer that points to the corresponding disk block descriptor.

Each descriptor also includes a type flag for indicating the type of the block. Type 1 means that the block is a free block not containing any object or a portion thereof. Type 2 indicates that the block contains a single-block object, which is the most common case. Types 3, 4, and 5 are used for multi-block objects. Type 3 indicates that the block is the head of a multi-block object. Type 4 indicates that the block is a middle section of the object, and type 5 indicates that the block is the tail section of the object. Each of the head and middle block descriptors also contains a pointer to the descriptor for the next block descriptor of the multi-block object. Middle & tail block descriptors also point to the head block descriptor of that object.

Each descriptor also contains the key used to identify the cached object. In the context of web caching, the key for a downloaded object is the URL of that object. For access control purposes, the descriptor also contains a lock status, which indicates whether the block is currently involved in a read or write operation. The descriptor further includes "hot context" data for indicating whether the block is "hot" and, if so, the context of the hot status.

Besides the descriptors, the cache unit system includes an index 180 for locating a cached object through the descriptor or descriptors of the object. An index is a container of key-object pairs. It supports the primitive insert and find functions. The insert function gets as parameters a key and a pointer to the corresponding object, and inserts this pair into the index container. The find function gets as a parameter the key of a desired object, and searches for that object in the index container. If that object is found, it returns a pointer to that object.

Figure 6:
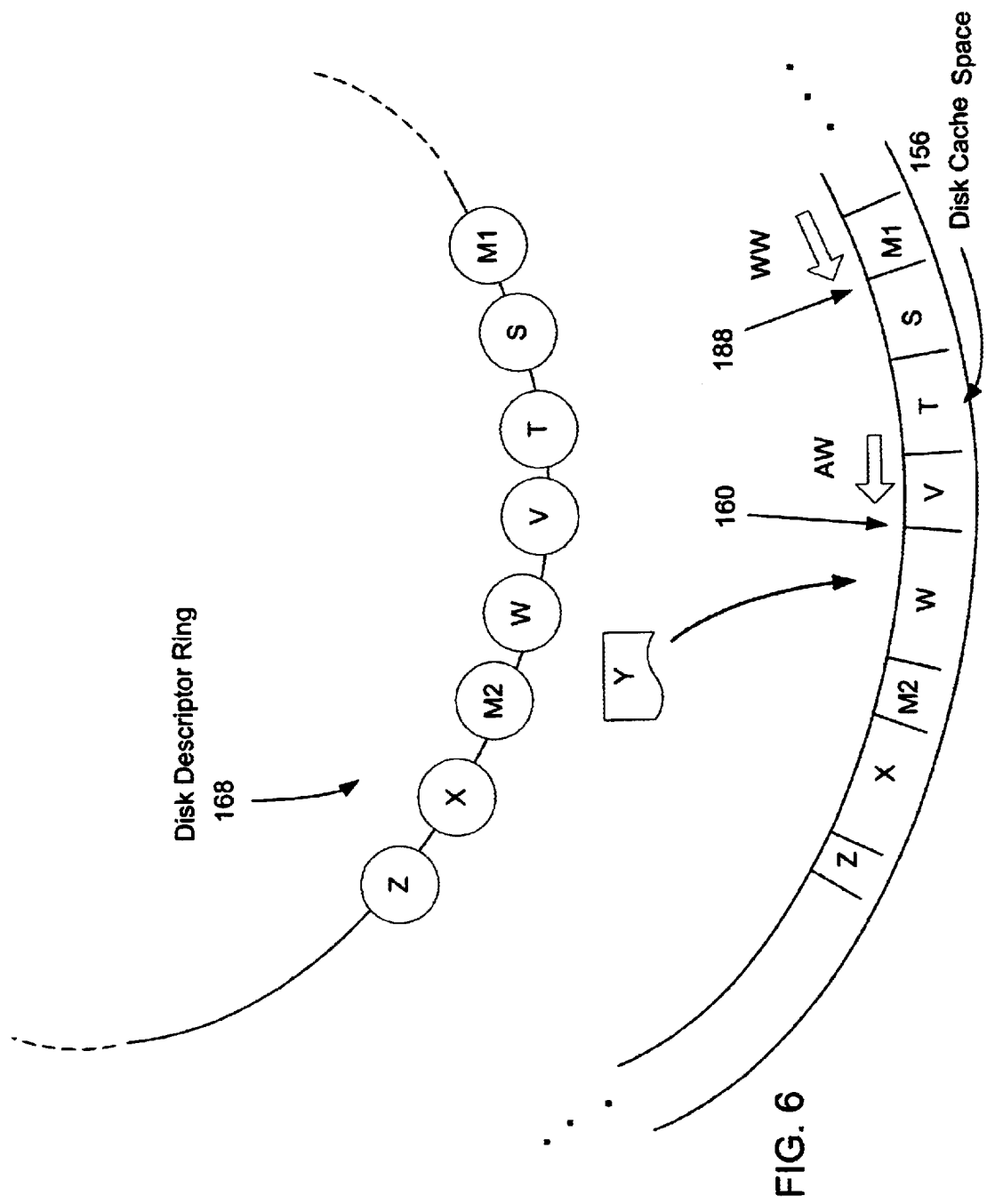
FIG. 6 is a schematic diagram showing an example of reclaiming and allocating space in a disk cache space for writing new objects with the aid of a descriptor ring.
Figure 7:
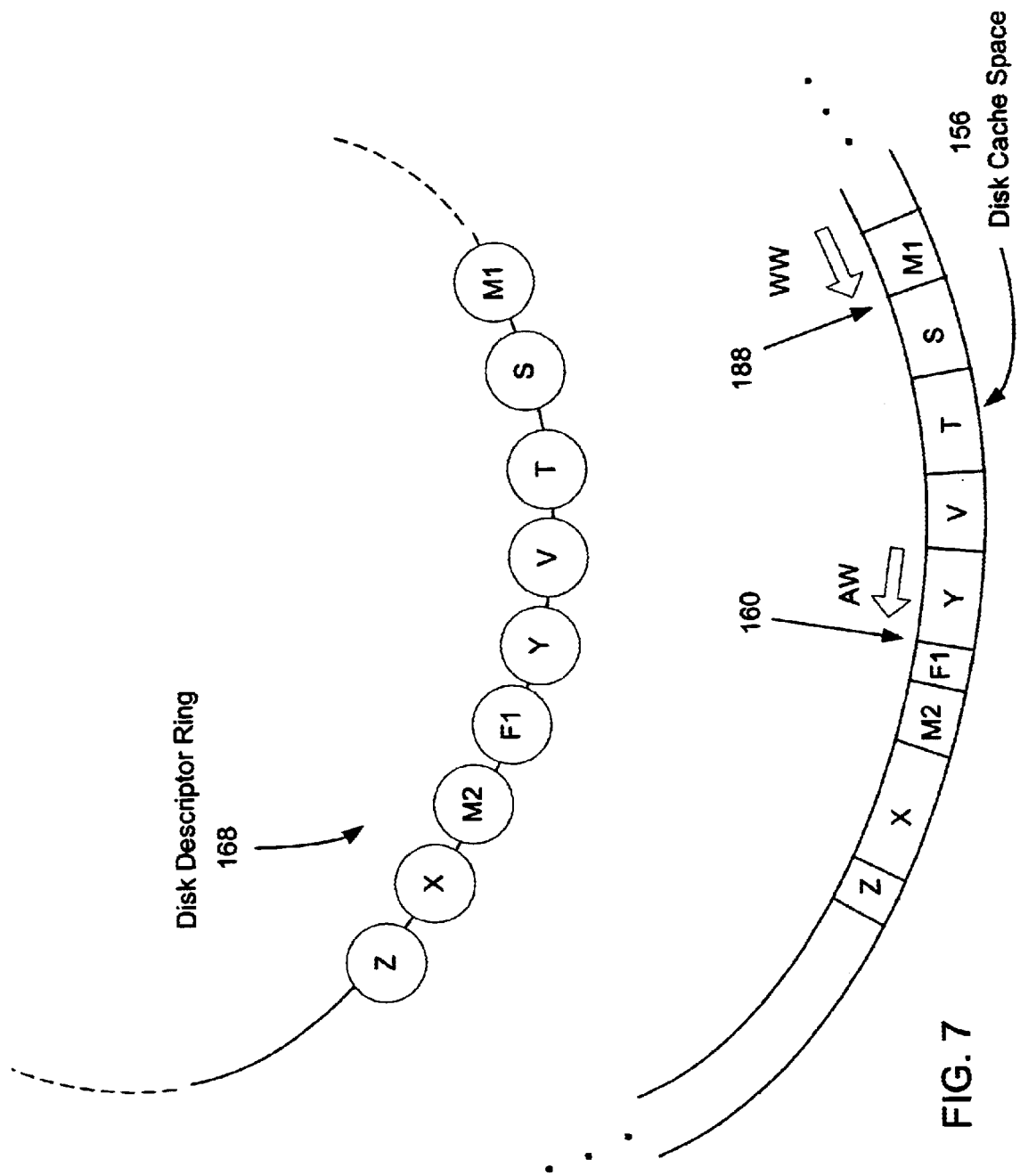
FIG. 7 is a schematic diagram showing the disk cache space and the descriptor ring of FIG. 6 modified by allocation operations according to one scenario of the example.
Figure 8:
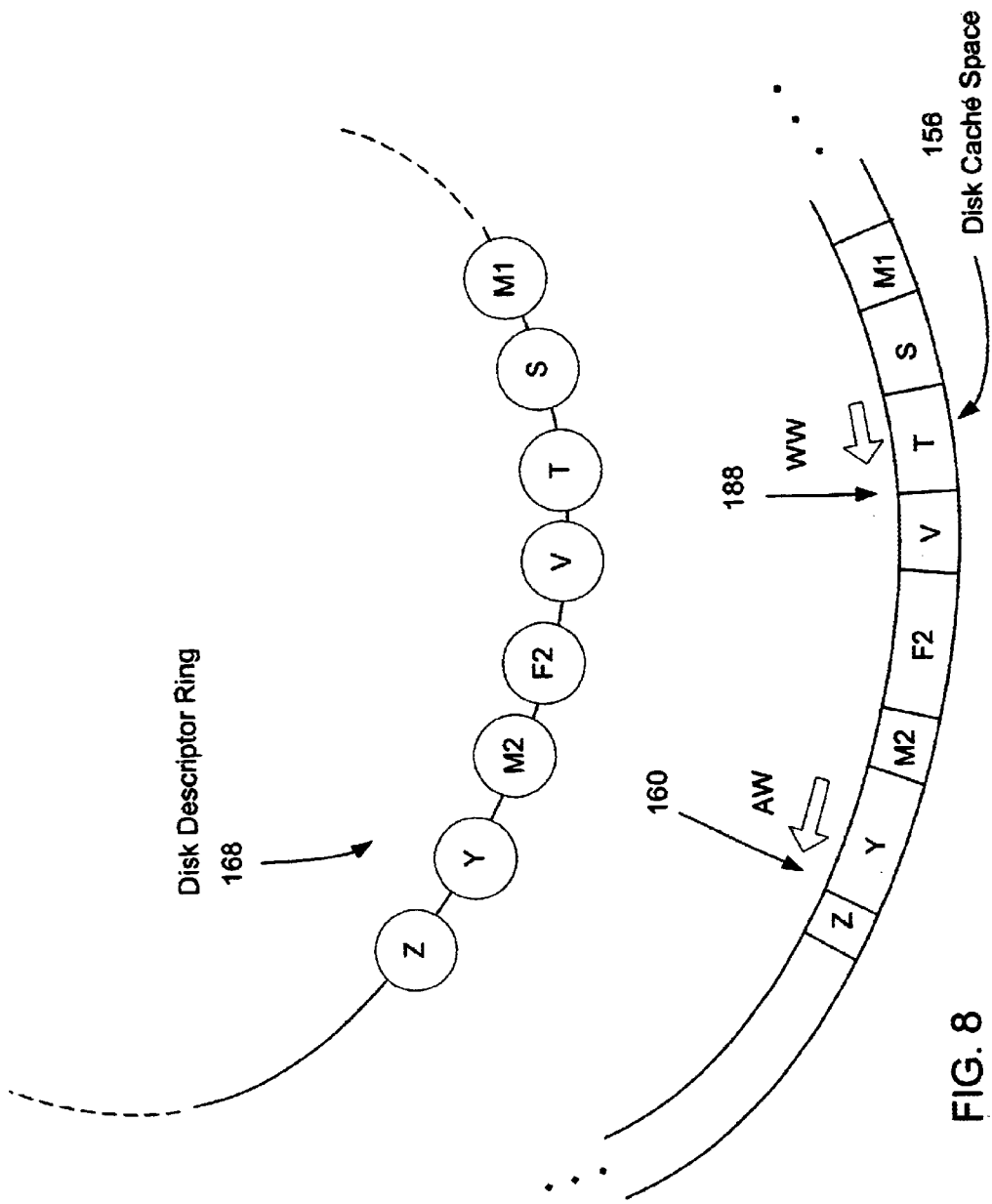
FIG. 8 is a schematic diagram showing the disk cache space and the descriptor ring of FIG. 6 modified by allocation operations according to another scenario of the example.

FIGS. 6, 7, and 8 illustrate how the disk cache space is allocated for writing new objects by way of an example. FIG. 6 shows the a portion of the disk cache space 156 and the corresponding portion of the disk descriptor ring 168 prior to the allocation of space for a new object Y, which is a single-block object currently buffered in the memory cache space. Before the allocation operation, the shown portion of the disk cache space 156 includes data blocks M1, S, T, V, W, M2, X, Z, and so on. Of these blocks, M1 and M2 are the head block and a middle block, respectively, of a multi-block object M, and the other blocks each contains a single-block object identified by the same letter. The object M is also a hot object, i.e., it is not to be written over with new objects.

The point up to which the disk cache space 156 has been allocated for writing new objects is identified by an "Allocation Wave" ("AW") pointer 160. In the illustrated example, the AW pointer 160 is shown to be pointing at the beginning of the block W, indicating that the block V is the last block that has been allocated for writing. Another pointer, called the "write-wave" ("WW") pointer 188, indicates the block up to which the writing operations have actually started. The WW pointer 188 trails behind the AW pointer 186, since the writing cannot be performed before the needed amount of cache space is allocated. The various waves discussed herein are conceptual references. In a preferred embodiment, they are implemented by means of pointers to the corresponding block descriptors rather than the actual blocks in the cache space.

To find sufficient space for writing the new object Y, the allocation logic checks the descriptor of the block next to the AW pointer 160, which is the block W in this example. In one scenario of the example corresponding to FIG. 7, the block W is not a hot object and has a size larger than that of the new block Y. Since the block W is not hot, its space can be reclaimed. Because the space of W is more than needed for the object Y, the allocation logic breaks it into to two blocks. The first block is of the size of the object Y and allocated for writing Y, and the other block is a free block, which is designated as F1 in FIG. 7. For example, if the size of the block W is 11 KB and the size of the object Y is 8 KB, the block W is split into one block of 8 KB allocated for Y and a free block of 3 KB bytes.

The disk descriptor ring 156 is accordingly modified to reflect this change. The modification includes removing the descriptor for W and inserting two new descriptors corresponding to Y and F1 into the linked list of the descriptor ring 156. The AW pointer 186 is moved to the beginning of the free block F1, indicating that the cache space up to F1 has been allocated. The space of the free block F1 may be reclaimed when the disk space manager allocates space for writing the next new object.

In a different scenario corresponding to FIG. 8, the block W is too small for Y. To find reclaimable space, the allocation logic checks the next block, which is M2, one of the blocks of the object M. The object M is, however, a hot object. Accordingly, the allocation logic treats M2 as an "interruption" and passes it over. Since W is too small by itself and cannot be combined with the adjacent block M2 to provide enough space, the allocation logic reclaims its space and marks the reclaimed space "freed." In the illustration, this is done by replacing the descriptor for W with a descriptor F2 that specifies the same block size but with the type flag set to 1.

Since it still needs more space, the allocation logic checks the block after M2, which is X. X is not "hot," so the allocation logic reclaims its space. In the example illustrated in FIG. 8, it is assumed that X and Y happen to have the same size. The allocation logic then reclaims the space occupied by X and allocates the reclaimed space to Y. This involves replacing the descriptor for X with a descriptor for Y. The allocation wave pointer is then moved to the beginning of the block Z. The resultant blocks in the disk cache space 156 and the associated descriptor ring 168 after this allocation operation is shown in FIG. 8.

When a block that belongs to a multi-block object (e.g., the object M in the example) is reclaimed, all the other blocks occupied by M are conceptually freed as well. There are various ways to implement this operation. A performance sensitive implementation may apply an amortized mechanism to do that (to avoid a loop through the linked list of the descriptors of the blocks comprising the multi-block object). When a new object reclaims space that is occupied by several blocks, the descriptors for those blocks are not needed anymore. A well-written implementation should release them properly.

As mentioned above, each of the disk cache space 156 and the memory cache space 152 is managed as a cyclic queue with interruptions, and new objects are written into the cyclic queue in a generally first-in-first-out ("FIFO") manner but with care taken to pass over the interruptions. Moreover, the two cyclic queues are coupled together by the operations of copying objects from the memory cache space 152 into the disk cache space 156. As described above, the memory cache space is used as a buffer for downloaded objects before they are written into the disk cache space.

Figure 9:
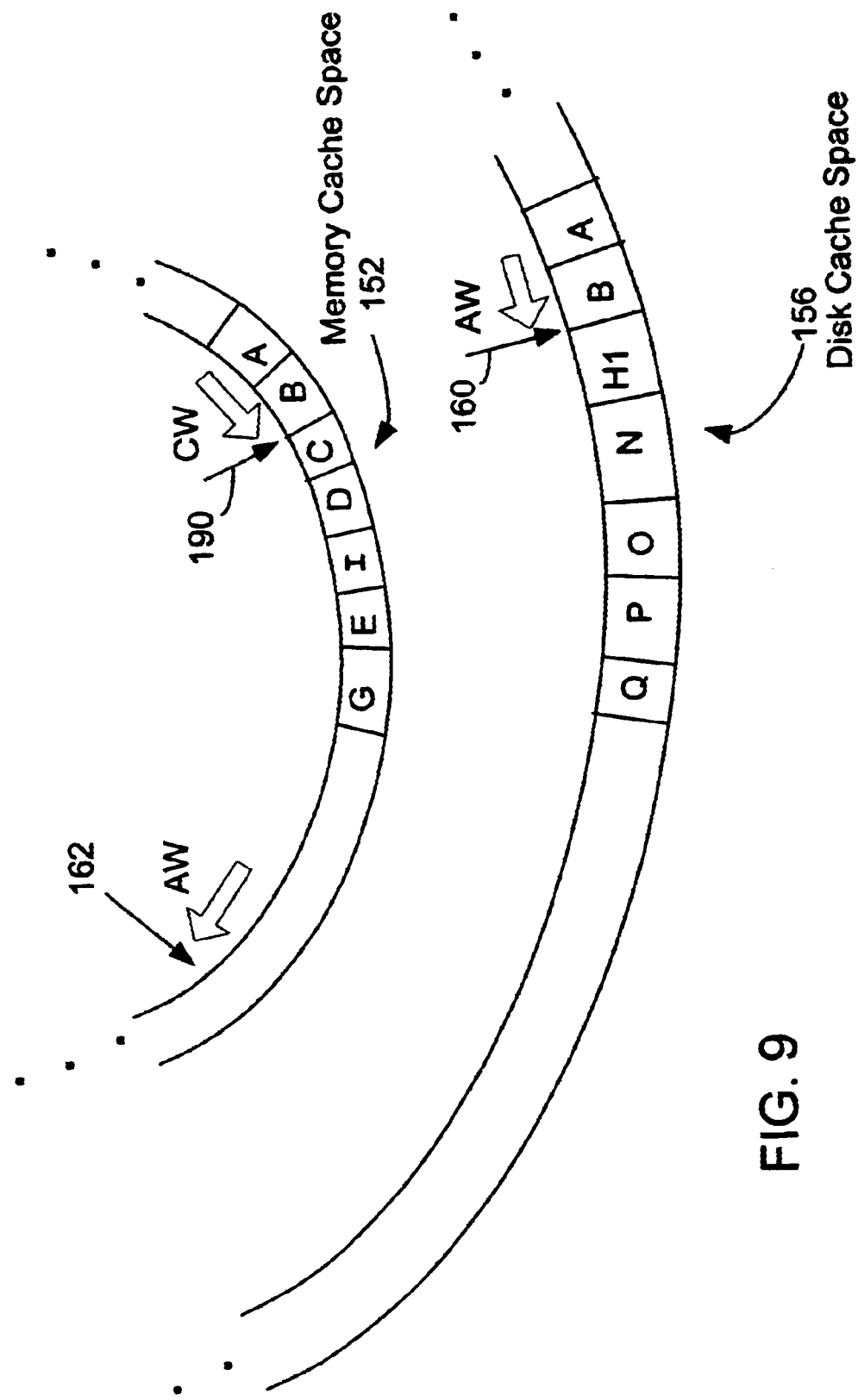
FIG. 9 is a schematic diagram showing a portion of a disk cache space and a corresponding portion of a memory cache space that are coupled by operations of copying data objects from the memory cache space to the disk cache space.

In accordance with a feature of the embodiment, the copying of objects buffered in the memory cache space 152 into the disk cache space 156 is also managed according to the "FIFO with interruptions" model. This concept is illustrated in FIG. 9, in which the disk cache space 156 is shown as a large circle and the memory cache space 152 is shown as a small circle within the large circle. Each of the circular cache spaces is shown with its allocation wave ("AW") pointer and write wave ("WW") pointer. In addition, there is a "copy wave" ("CW") pointer 190 indicating the point in the memory cache space 152 up to which objects buffered in the memory cache space are being copied into the disk cache space.

To illustrate this coupling between the two circular spaces, in an example shown in FIG. 9, the circular memory cache space 152 includes blocks A, B, C, D, I, E, G and so on, and the disk cache space 156 includes blocks A, B, H1, N, O, P, Q, and so on. The memory block I is an "interruption," meaning that it should not be copied into the disk cache space. A memory block can be an interruption for the copying operation for different reasons. For example, the block may be currently involved in a read of write operation, the downloading of data for that block may be still going, etc.

In the shown example of FIG. 9, the copy wave pointer 190 is currently at the beginning of C, indicating that the objects up to but not including C (i.e., objects A and B and objects before them) in the memory cache space are being copied into the disk memory cache. The allocation wave pointer 160 of the disk cache space is at the beginning of Hi, indicating that the allocation logic has allocated the space for object B.

As the copying operation continues, blocks C and D are being copied into the disk cache space, and the allocation logic allocates disk cache space for blocks C and D. In this allocation process, H1 is untouched since it is a hot object. The space of the blocks N and O are reclaimed and allocated for blocks C and D. When the copy wave pointer 190 moves to the object I, however, the copying logic determines from the descriptor for the object I that I is an interruption and should not be copied into the disk cache space. The copy logic accordingly skips over I and moves on to copy blocks E and G into the disk space. The blocks in the memory space and the disk space after the disk space has been allocated for blocks E and G are shown in FIG. 10.

Figure 10:
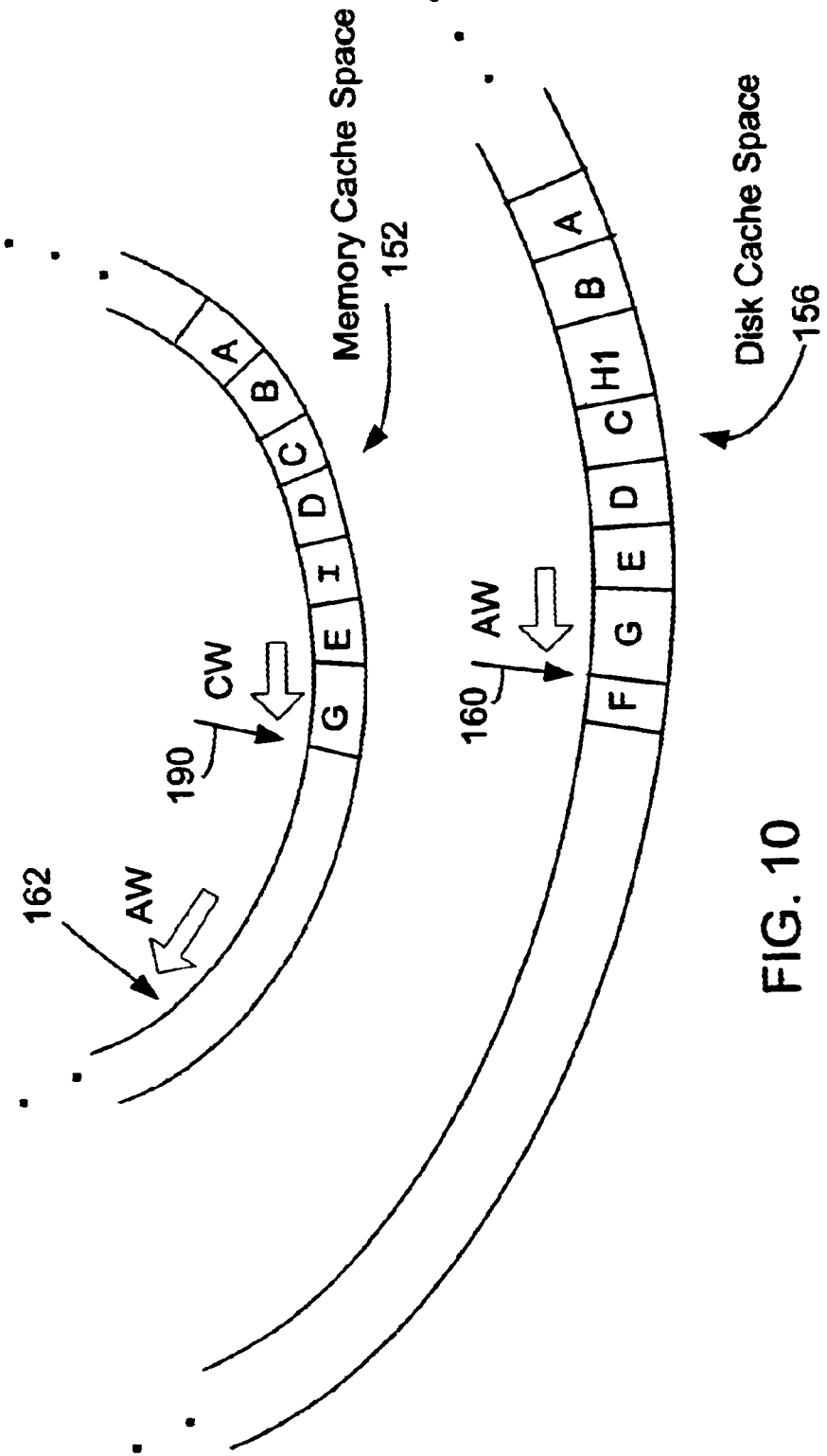
FIG. 10 is a schematic diagram showing the memory cache space and disk cache space of FIG. 9 after several data blocks are copied from the memory cache space into the disk cache space.

As can be seen from FIGS. 9 and 10, the movement of the allocation wave for the disk cache space is generally correlated with the movement of the copy wave for the memory cache space. In this regard, the coupling between the memory cache space and the disk cache space by the copy operations can be envisioned conceptually as a smaller circle representing the memory cache space rolling on the inside of a larger circle representing the disk cache space, with skidding and sliding caused by the interruptions in both the memory cache space and the disk cache space. The point where the smaller circle contacts the larger circle corresponds roughly to the front of the copy wave in the memory cache space and the front of the allocation wave for the disk cache space. In this way, the two cache spaces are coupled together, resulting in smooth, low-overhead, and effective use of the overall cache space, disk heads, hardware caches of the CPU & motherboard, and bandwidth of the peripheral and disk buses.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for managing usage of storage space of a cache, comprising:
   connecting two ends of the storage space of the cache for read and write operations;
   setting an allocation pointer indicating a point in the cache up to which storage space has been reclaimed and allocated for writing new data objects into the cache;
   receiving a new data object to be written into the cache;
   reclaiming storage space occupied by one or more existing cache objects located adjacent and downstream from the allocation pointer until sufficient storage space is reclaimed for writing the new object, the reclaiming including determining whether said one or more existing cached objects are not to be overwritten and passing over any of the one or more existing cached objects if said any of the one or more existing cached objects is not to be overwritten;
   allocating the reclaimed space to the new object; and
   updating the allocation pointer to indicate a new point in the cache up to which storage space is reclaimed and allocated for writing the new data object,
   wherein the step of reclaiming includes splitting an existing block into a first portion for writing the new data object and a second portion forming a free block.

2. A computer-readable medium as claim 1, wherein the storage space of the cache resides on a mass storage device of a computer.

3. A computer-readable medium as in claim 2, having further computer-executable instructions for performing the steps of:
   storing the new data object in a buffer in a main memory of the computer; and
   copying the new data object from the buffer into the storage space of the cache on the mass storage area.

4. A computer-readable medium as in claim 1, wherein the storage space of the cache resides in a main memory of a computer.

5. A computer-readable medium as in claim 1, wherein the new data object is a data object downloaded from the Internet.

6. A computer-readable medium as in claim 1, wherein the step of determining determines that said any of the one or more existing cached objects is not to be overwritten when said any of the one or more existing cached objects is recently or frequently accessed.

7. A computer-readable medium as in claim 1, wherein the storage space of the cache is divided into blocks, and wherein the computer-readable medium has further computer-executable instructions for performing the steps of maintaining a plurality of descriptors each corresponding to a block in the cache, and updating the descriptors in connection with the steps of reclaiming and allocating.

8. A computer-readable medium as in claim 7, wherein the blocks in the cache are of variable sizes.

9. A computer-readable medium having computer-executable instructions for performing steps to manage a cache system, comprising:

(1) providing a first cache space and a second cache space;
(2) writing new objects to be buffered into the first cache space, including:
   (a) setting a first allocation pointer indicating a point in the first cache space up to which storage space has been reclaimed and allocated for buffering new objects in the first cache space;
   (b) receiving a new object to be buffered in the first cache space;
   (c) reclaiming storage space occupied by one or more existing buffered objects located adjacent and downstream from the first allocation pointer until sufficient storage space is reclaimed for writing the new object, the reclaiming including determining whether the one or more existing cached objects are not to be overwritten and passing over any of the one or more existing buffered objects if said any of the one or more existing buffered objects is not to be overwritten;
   (d) allocating the reclaimed space for buffering the new object;
   (e) updating the first allocation pointer to indicate a new point in the first cache up to which the reclaimed space is allocated for buffering the new object, and
(3) copying buffered objects from the first cache space into the second cache space, including:
   (a) setting a copy pointer indicating a point in the first cache space up to which buffered objects are being copied to the second cache space;
   (b) setting a second allocation pointer indicating a point in the second cache space up to which storage space has been reclaimed and allocated for copying buffered data objects from the first cache space;
   (c) determining whether a target buffered object in the first cache space adjacent and downstream of the copy pointer is to be copied to the second cache space;
   (d) if the target buffered object is to be copied,
      (i) reclaiming storage space occupied by one or more existing cached objects in the second cache space located adjacent and downstream from the second allocation pointer until sufficient storage space is reclaimed for copying the target buffered object, the reclaiming including determining whether the one or more existing cached objects are not to be overwritten and passing over any of the one or more existing cached objects if said any of the one or more existing cached objects is not to be overwritten;
      (ii) allocating the reclaimed storage space for copying the target buffered object;
      (iii) updating the second allocation pointer to indicate a new point in the second cache space up to which the reclaimed storage space is allocated for copying the target buffered object; and
      (iv) updating the copy pointer by moving the copy pointer over the target buffered object.

10. A computer-readable medium as in claim 9, wherein the first cache space resides in a main memory of a computer, and the second cache space resides in a mass storage device of the computer.

11. A computer-readable medium as in claim 10, wherein the new data object is a data object downloaded from the Internet.

12. A computer-readable medium in claim 11, having further computer-executable instructions for maintaining a plurality of descriptors each containing data describing a corresponding block in the second cache space, the descriptors are linked to form a linked list in accordance with orders of their respective blocks in the second cache space.

13. A computer-readable medium as in claim 12, having further computer-executable instructions for maintaining a second plurality of descriptors each containing data describing a corresponding block in the first cache space, the second plurality of descriptors are linked to form a linked list in accordance with orders of their respective blocks in the first cache space.

14. A computer-readable medium having computer-executable instructions for performing steps to manage a cache system, comprising:
   buffering new objects in a first cache space, including, for each new object, moving a first allocation pointer in a first pre-selected direction over at least one existing buffered object in the first cache space and reclaiming storage space from the at least one existing buffered object if the at least one existing buffered object is allowed to be overwritten; and
   copying buffered objects from the first cache space into a second cache space, including:
      moving a copy pointer in said first pre-selected direction over a target buffered object;
      determining whether the target buffered object is to be copied into the second cache space,
      if the target buffered object is to be copied, moving a second allocation pointer in a second pre-selected direction over at least one existing cached object in the second cache space and reclaiming storage space from the at least one existing cached object if the at least one existing cached object is allowed to be overwritten; and
      copying the target buffered object into the storage space reclaimed from the at least one existing cached object.

15. A computer-readable medium as in claim 14, wherein the first cache space resides in a main memory of a computer and the second cache space resides on a mass storage device of the computer.

16. A computer-readable medium as in claim 15, wherein the new data objects are data objects downloaded from the Internet.

* * * * *

UNITED STATES PATENT AND TRADEMARK OFFICE
CERTIFICATE OF CORRECTION

PATENT NO. : 6,654,856 B2
DATED : November 25, 2003
INVENTOR(S) : Frank

It is certified that error appears in the above-identified patent and that said Letters Patent is hereby corrected as shown below:

Column 11,
Line 28, "Hi," should read -- H1 --.

Signed and Sealed this

Twenty-second Day of June, 2004

JON W. DUDAS
*Acting Director of the United States Patent and Trademark Office*